US006713597B2

(12) United States Patent
Lindway

(10) Patent No.: US 6,713,597 B2
(45) Date of Patent: Mar. 30, 2004

(54) PREPARATION OF POLYIMIDE POLYMERS

(75) Inventor: Martin John Lindway, Newburgh, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/063,093

(22) Filed: Mar. 19, 2002

(65) Prior Publication Data

US 2003/0181626 A1 Sep. 25, 2003

(51) Int. Cl.[7] .................. C08G 73/10; B32B 27/00; C08L 79/08
(52) U.S. Cl. .................. 528/353; 528/125; 528/126; 528/128; 528/170; 528/171; 528/172; 528/173; 528/185; 528/188; 528/220; 528/229; 528/350; 528/351; 528/480; 528/490; 528/491; 528/502 R; 528/502 A; 427/256; 427/287; 427/372.2; 427/375; 525/420; 525/422; 525/425; 525/437; 428/221; 428/323; 428/324; 428/325; 428/326; 428/327; 428/337; 428/338; 428/339; 428/411.1; 428/412; 428/419; 428/458; 428/473.5
(58) Field of Search ............... 528/125, 126, 528/128, 170, 171–173, 185, 188, 220, 229, 350, 353, 357, 480, 490, 491, 502 A, 502 R; 525/420, 425, 422, 437; 427/372.2, 375, 256, 287; 428/221, 323, 324, 325, 326, 327, 337, 338, 339, 411.1, 412, 419, 426, 457, 458, 473.5

(56) References Cited

U.S. PATENT DOCUMENTS

| | | | | |
|---|---|---|---|---|
| 3,575,923 A | | 4/1971 | Jones ..................... 528/128 |
| 3,833,544 A | | 9/1974 | Takekoshi et al. ........... 260/47 |
| 3,980,601 A | * | 9/1976 | Marx et al. ................. 524/513 |
| 3,998,840 A | | 12/1976 | Williams, III et al. ...... 260/326 |
| 4,098,800 A | | 7/1978 | Banucci et al. .......... 260/346.3 |
| 4,161,564 A | * | 7/1979 | Legbandt .................... 428/381 |
| 4,197,396 A | | 4/1980 | Banucci et al. ............. 528/208 |
| 4,221,897 A | | 9/1980 | Takekoshi ................... 528/125 |
| 4,324,882 A | | 4/1982 | Takekoshi ................... 528/206 |
| 4,417,044 A | | 11/1983 | Parekh ........................ 528/179 |
| 4,599,365 A | * | 7/1986 | Gagliani et al. .............. 521/56 |
| 4,680,224 A | | 7/1987 | O'Connor ................... 428/294 |
| 4,690,972 A | | 9/1987 | Johnson et al. ............. 524/609 |
| 4,792,481 A | | 12/1988 | O'Connor et al. .......... 428/288 |
| 4,800,113 A | | 1/1989 | O'Connor ................... 428/175 |
| 4,835,249 A | | 5/1989 | Gallagher et al. .......... 528/353 |
| 4,900,499 A | | 2/1990 | Mills .......................... 264/257 |
| 4,921,558 A | | 5/1990 | Johnson et al. ............. 156/181 |
| 4,970,261 A | | 11/1990 | Yu et al. ..................... 524/609 |
| 5,019,427 A | | 5/1991 | Soules ........................ 427/375 |
| 5,298,318 A | | 3/1994 | Soules et al. ............... 428/273 |
| 5,338,765 A | * | 8/1994 | Near et al. ................. 521/50.5 |
| 5,357,040 A | * | 10/1994 | McGrath et al. ............ 528/490 |
| 5,509,795 A | * | 4/1996 | Near et al. .................. 425/4 C |
| 5,975,874 A | * | 11/1999 | Daly et al. .................. 425/204 |
| 6,063,874 A | * | 5/2000 | Jin et al. ..................... 525/390 |
| 6,228,897 B1 | * | 5/2001 | Daly et al. .................... 521/79 |
| 6,376,026 B1 | * | 4/2002 | Correll et al. ............... 427/512 |

FOREIGN PATENT DOCUMENTS

WO    WO 99/06470    11/1999

OTHER PUBLICATIONS

Patent Abstracts of Japan vol. 014, No. 480 (C–0771), Oct. 19, 1990 & JP 02 199176 A (Asahi Chem Ind Co Ltd), Aug. 7, 1990 abstract.

* cited by examiner

*Primary Examiner*—P. Hampton Hightower

(57) ABSTRACT

A process for the preparation of a reactive friable polyimide powder comprises dissolving an aromatic dianhydride and an organic diamine in a high-boiling, aprotic organic solvent to form a reaction solution; heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder.

50 Claims, No Drawings

PREPARATION OF POLYIMIDE POLYMERS

BACKGROUND OF INVENTION

This disclosure relates to the preparation of polyimides.

Polyimides, which include polyetherimides, are thermoplastic polymers with a number of desirable properties such as high strength, high toughness, excellent chemical resistance and high temperature stability due to a high glass transition temperature. They are typically high viscosity materials and the high viscosity combined with the high glass transition temperature can hinder the use of polyimides, particularly polyetherimides, in blends, composites, and coatings.

For example, because of the high glass transition temperature of polyimides, blending may require that the components be heated to a temperature above the decomposition temperature of many polymers. The high viscosity can hinder intimate mixing of components, creating blends and composites with large domains of polyimide or polyetherimide and inconsistent properties. Powdered forms of polyimide and polyetherimide are available, but these non-reactive powders do not overcome the problems associated with high temperature and high viscosity materials. Additionally, the high toughness and high strength of polyimide and polyetherimide makes conventional milling of polyimide and polyetherimide pellets expensive. There currently appears to be no known methods for making a friable polyimide powder.

Polyimides and polyetherimides have been prepared by a variety of processes. The two basic processes used for making these polymers are the so-called "melt polymerization" process and the "solution polymerization" process. The melt polymerization process involves combining an aromatic dianhydride, an organic diamine and an optional catalyst and heating the mixture under an inert atmosphere to form a homogeneous melt. Water formed during the polymerization reaction is removed at a temperature of up to 350° C., and the final stage of the reaction is advantageously conducted under reduced pressure to facilitate removal of water.

Solution polymerization is generally conducted by reacting an aromatic dianhydride and an organic diamine in an inert solvent at temperatures up to about 200° C. With this procedure, water formed during the reaction is typically removed by azeotropic distillation. The resulting polymer is generally recovered by mixing the reactant solution with a precipitant, such as methanol. The reaction solvents employed for solution polymerization reactions are selected for their solvent properties and their compatibility with the reactants and products. High-boiling, nonpolar organic solvents have been preferred. Dipolar, aprotic solvents and phenolic solvents have also been used.

In another process polyimides can be made by reacting an aromatic dianhydride with an organic diamine in an inert solvent to form a prepolymer-solvent mixture, removing the solvent from the mixture by thin-film evaporation and heating the resulting prepolymer (e.g., in an extruder) to a temperature above its glass transition temperature to form the desired polyimide product.

Finally, polyimides and polyetherimides can be prepared by reacting substantially equimolar amounts of dianhydride and diamine and an optional termination agent in a high boiling aprotic solvent under imidization conditions to form an insoluble polyimide prepolymer, separating the insoluble polyimide prepolymer and then melt polymerizing the insoluble polyimide prepolymer under imidization conditions to result in a high molecular weight polyimide.

SUMMARY OF INVENTION

A process for the preparation of a reactive, friable polyimide powder comprises dissolving an aromatic dianhydride and an organic diamine in a high-boiling, aprotic organic solvent to form a reaction solution; heating the reaction solution under imidization conditions to form an insoluble, reactive polyimide and to effect substantially complete distillation of the water of reaction out of the reaction solution; and separating the insoluble, reactive polyimide from the reaction solution to form a reactive, friable polyimide powder.

DETAILED DESCRIPTION

A process for the preparation of a reactive friable polyimide powder comprises dissolving an aromatic dianhydride and an organic diamine in a high-boiling, aprotic organic solvent to form a reaction solution; heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder. The reactive friable polyimide powder may be further processed by drying, milling or a combination of drying and milling. Drying reduces the amount of solvent remaining in the reactive polyimide powder. Milling the reactive polyimide powder reduces the particle size. The reactive friable polyimide powder may be used to make previously unavailable composites, coatings, films, hollow fibers, and blends. The particulate size of the powder can be controlled by the selection of reaction conditions, milling conditions or a combination of reaction and milling conditions. Particulate size is preferably less than or equal to about 100 microns.

The reactive friable polyimide powder is highly suitable for the production of composite materials. It can be contacted with a substrate by methods known in the art suitable for use with powders. Optionally an additional polymer powder may also be mixed with the reactive friable polyimide powder. The substrate/polyimide powder or substrate/polyimide powder blend is then heated to a temperature above the softening point, melting point or glass transition point of the reactive friable polyimide powder or polyimide powder blend. Upon heating, the reactive friable polyimide powder or powder blend flows, resulting in good coverage of the substrate, and may also proceed to polymerize further, resulting in a higher molecular weight polyimide composite. The reactive friable polyimide powder or powder blend is especially suitable for use with powder coating methods, whereby the reactive friable polyimide powder (or blend) is applied to a substrate, then heated to a molten or semi-molten state. The reactive friable polyimide powder (or powder blend) flows to coat the substrate and may further polymerize to form a very high molecular weight polyimide coating.

The reactive friable polyimide powder may be used in combination with other polymers to form previously unavailable blends. The small particle size and presence of reactive functional groups allows a more intimate mixing with other polymers and facilitates the preparation of polymer blends.

Reactive friable polyimide powder comprises repeating structural units having the general formula (I)

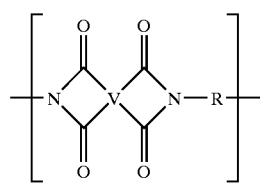

(I)

wherein V is a tetravalent substituted or unsubstituted aromatic monocyclic or polycyclic linker having about 5 to about 50 carbon atoms. Suitable substitutions include, but are not limited to, ethers, epoxides, amides, esters, and combinations thereof. Preferred linkers include, but are not limited to, tetravalent aromatic radicals of formula (II), such as

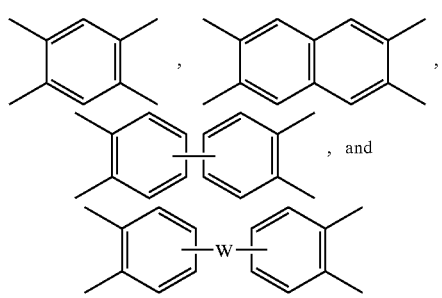

(II)

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III)

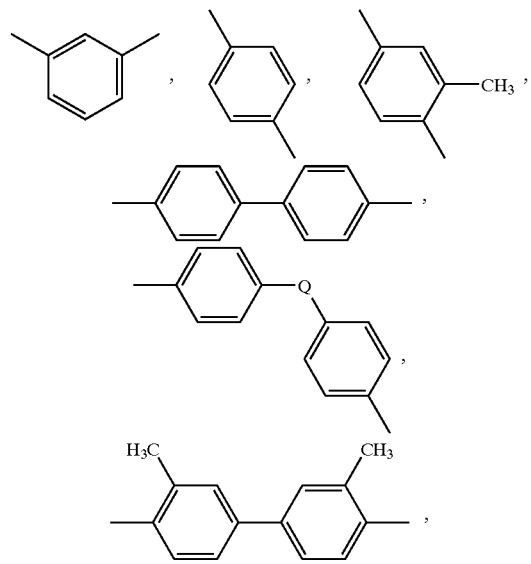

(III)

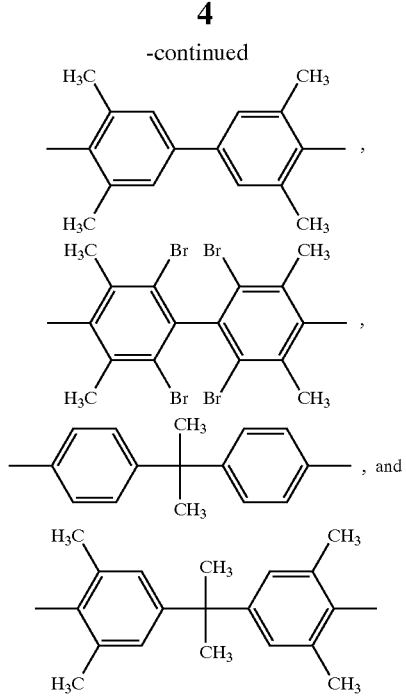

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV)

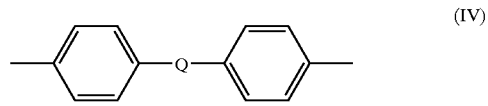

(IV)

wherein Q includes but is not limited to a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups.

A preferred class of polyimides is polyetherimides. Preferred polyetherimide resins comprise structural units of the formula (V)

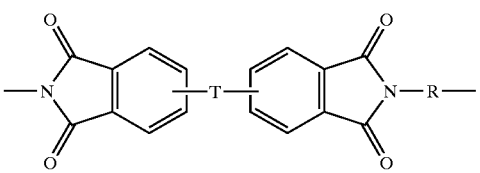

(V)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III) as defined above.

In a particularly preferred embodiment, the polyetherimide resin comprises structural units according to formula (V) wherein each R is a p-phenylene group and T is a divalent radical of the formula (VII)

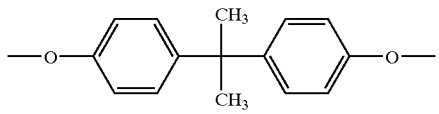

(VII)

Illustrative examples of aromatic dianhydrides include: 2,2-bis(4-(3,4-dicarboxyphenoxy)phenyl)propane dianhydride; 4,4'-bis(3,4-dicarboxyphenoxy) diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis(4-(2,3-dicarboxyphenoxy)phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride as well as mixtures comprising one of the foregoing dianhydrides.

The aromatic dianhydrides can be prepared by hydrolysis, followed by dehydration, of the reaction product of a nitro substituted phenyl dinitrile with a metal salt of dihydric phenol compound in the presence of a dipolar, aprotic solvent. A preferred class of aromatic dianhydrides includes compounds wherein T is of the formula (VI)

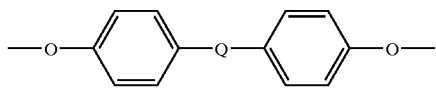

(VI)

and the ether linkages, for example, are preferably in the 3,3', 3,4', 4,3', or 4,4' positions, and mixtures thereof, and where Q is as defined above. Dianhydrides may contain small amount of anhydrides as impurities. As can readily be appreciated by one of ordinary skill in the art, the presence of anhydrides can hinder polymerization. Therefore it is preferred that the amount of anhydride present in the dianhydride be less than about 3 mole percent (mol %), more preferably less than about 2 mol %, and most preferably less than about 1.5 mol %, based on the total number of moles of dianhydride.

Examples of suitable organic diamines include, but are not limited to, are p-phenylenediamine, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylene-diamine, benzidine, 3,3"-dimethylbenzidine, 3,3"dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, 1,3-bis (3-aminopropyl) tetramethyldisiloxane and mixtures comprising at least one of the foregoing organic diamines. The preferred organic diamines are aromatic diamines, especially p-phenylenediamine. Unexpectedly, m-phenylenediamine cannot be used to prepare powdered polyimides by the process described herein when o-dichlorobenzene is the aprotic solvent due to the fact that the resulting polyimide does not form an insoluble polyimide that can be separated by solid-liquid separation techniques. Use of m-phenylenediamine when o-dichlorobenzene is the solvent results in a gel-like polyimide.

In general, the process for the preparation of powdered polyimide can be carried out employing well-known high boiling aprotic solvents, e.g., toluene, xylene, ethylbenzene, propylbenzene, chlorobenzene, dichlorobenzene, trichlorobenzene, biphenyl, terphenyl, diphenylether, diphenyl sulfide, acetophenone, chlorinated biphenyl, chlorinated diphenylethers, and mixtures comprising one of the foregoing organic solvents. Preferred solvents are the chlorobenzenes, particularly o-dichlorobenzene. The high boiling, aprotic organic solvent advantageously has a boiling point above about 110° C., preferably above about 150° C. The higher boiling point of the solvent permits reaction temperatures sufficiently high to effect rapid and efficient conversion of the reactants to the desired polyimide product without employing pressurized reaction vessels.

The organic diamine, aromatic dianhydride and aprotic solvent are selected such that the diamine and dianhydride are sufficiently soluble in the solvent to allow the reaction to proceed and the insoluble polyimide forms a particulate precipitate in the chosen solvent, thus enabling separation of the product from the solvent in a straightforward manner using solid-liquid separation techniques.

The aromatic dianhydride and organic diamine may be present in the solvent in substantially equimolar amounts (described herein as producing an equimolar reactive polyimide powder) or with the amine or anhydride in molar excess (described herein as producing an amine or anhydride terminated reactive polyimide powder). The term "substantially equimolar amounts" is herein defined as a molar ratio of aromatic dianhydride to organic diamine of about 0.9 to about 1.1, preferably about 0.95 to about 1.05 and more preferably about 0.98 to about 1.02. When the reaction mixture contains an excess of aromatic dianhydride a reactive polyimide powder predominantly terminated with anhydride groups results. When the reaction mixture contains an excess of organic diamine amine a reactive polyimide powder predominantly terminated with amine groups results. Typical molar excess can be described by a molar ratio of aromatic dianhydride to organic diamine or organic diamine to organic dianhydride of less than or equal to about 26, preferably less than or equal to about 20 and more preferably less than or equal to about 15 or greater than or equal to about 2, preferably greater than or equal to about 5 and more preferably greater than or equal to about 10.

The initial concentration of the aromatic dianhydride and the organic diamine in the high-boiling aprotic solvent may vary over a wide range. In general, the concentration is sufficient to maintain an efficient reaction rate and result in substantially complete precipitation of the reaction product. The concentration of the aromatic dianhydride and organic diamine affects the solids percentage of the mixture containing the insoluble polyimide in that when the aromatic dianhydride and organic diamine are present at a higher concentration a higher solids content results.

The reaction of the aromatic dianhydride and the organic diamine may be accelerated by using a polymerization catalyst. Such catalysts are well-known and are described in general terms in the U.S. Pat. Nos. 3,833,544, 3,998,840 and 4,324,882. A preferred catalyst is sodium phenyl phosphinate. When employed, the amount of catalyst is about 0.01 to about 0.05 grams of catalyst per one hundred grams of aromatic dianhydride.

The reaction between the aromatic dianhydride and the organic diamine is initiated by heating the reactants in the high-boiling, aprotic organic solvent to a temperature sufficiently high to effect the reaction. To avoid deleterious oxidation reactions, it is preferred that the reaction solution be blanketed under an inert gas during the heating step. Examples of such gases are dry nitrogen, helium, argon and the like. Dry nitrogen is generally preferred. The reaction is run at atmospheric pressure. The reaction temperature generally is about 110° C. to about 200° C., preferably about 135° C. to about 180° C., most preferably about 160° C. to about 180° C. A convenient means of conducting the reaction is to heat the reaction solution to the refluxing temperature of the reaction solvent. This permits simultaneous removal of any water formed as a result of the reaction. Conditions under which the reaction proceeds and the water formed as a result of the reaction is removed are known as imidization conditions. The reaction is maintained under imidization conditions until the insoluble polyimide precipitates out of the reaction mixture.

Water formed as a result of the reaction between the aromatic dianhydride and the organic diamine is advantageously continuously removed from the reaction solvent by azeotropic distillation. Substantially complete distillation of the water of reaction is defined as removal of greater than or equal to about 98%, preferably greater than or equal to about 99%, more preferably greater than or equal to about 99.5% and even more preferably greater than or equal to about 99.9%. The amount of water formed can be used to monitor the degree of completion of the reaction.

The insoluble reactive polyimide is separated from the reaction solution, for example by a solid-liquid separation technique, such as filtration or centrifugation. Preferably, the insoluble polyimide is separated by centrifugation and dried, e.g., under vacuum, to remove substantially all of the volatile materials. The resulting material has a particle size of about 100 to about 1500 microns and the residual volatiles content is typically less than about 3.5 weight % (wt %), preferably less than about 2.0 wt %, and more preferably less than about 1.0 wt %, based on the total weight of the material. The volatiles content is typically determined by gas chromatography. The residual volatiles content can be matched to the end use of the reactive friable polyimide powder.

The particle size of the reactive friable polyimide powder is typically related to the solids content of the reaction mixture. Solids content is herein defined as the percentage by weight of the insoluble reactive polyimide based on the weight of the total solution. The solids content of the mixture after precipitation of the insoluble polyimide is typically greater than or equal to about 10 weight % (wt %), preferably greater than or equal to about 15 wt % and more preferably greater than or equal to about 20 wt %, based on the total weight of the mixture. The solids content of the mixture is typically less than or equal to about 50%, preferably less than or equal to about 40%, and more preferably less than or equal to about 30%, based on the total weight of the mixture. The use of a low solids content can be economically disadvantageous however, due to the large amount of solvent used as well as a potentially low yield pf powder due to difficulties in powder recovery. Typically the solids content of the mixture is directly correlated to the size of the particles in that a low solids content results in a smaller particle size. However, this phenomenon has limits. The smallest particle size that can be obtained through the use of a low solids content is about 100 microns.

If a smaller particle size is desired the reactive friable polyimide powder may then be subjected to milling. Suitable milling techniques useful with polymers are known and jet milling is preferred. Jet milling subjects the particles to a pressurized stream of gas and particle size is reduced by interparticle collisions. Milling can result in particles as small as about 4 micrometers. Preferably the reactive friable polyimide powder has an average particle size of less than or equal to about 25 and more preferably less than or equal to about 15 micrometers. Particle size is generally determined by the end use of the reactive polyimide powder.

The reactive friable polyimide powder typically has a weight average molecular weight (Mw) of about 40,000 to about 80,000, preferably about 50,000 to about 70,000, and more preferably about 60,000 to about 70,000 as determined by gel permeation chromatography using polystyrene standards.

The reactive polyimide powder can be used to make composites with a wide variety of materials, including, for example particulate fillers, fibrous reinforcement in the form of cloth, mesh, yarns, rovings, thread, non-woven mats, continuous fibers, and chopped fibers, articles such as sheets or other three-dimensional forms, and combinations comprising one of the foregoing substrates, for example a sheet coated with a filled composite comprising the reactive polymer powder. When making composites, equimolar reactive polyimide powder, anhydride terminated reactive polyimide powder, amine terminated reactive polyimide powder and combinations of reactive polyimide powders may be used. When using anhydride terminated reactive polyimide powder in combination with amine terminated reactive polyimide powder it is preferable that the relative amounts of the two powders be such that substantively equimolar amounts of amine groups and anhydride groups are employed.

When employing particulate fillers as the substrate, the reactive polyimide powder may be contacted with the particulate filler by methods known in the art useful for combining particulate filler and powdered resin. These methods include, but are not limited to, dry blending followed by extrusion, dry blending followed by injection molding, and dry blending followed by compression molding. During the formation of the composite, the substrate/powder combination is heated to a temperature that allows flow of the reactive friable polyimide powder. Preferably the substrate/powder combination is heated to a temperature sufficient to permit further polymerization of the reactive polyimide powder, generally a temperature greater than the softening point and preferably a temperature greater or equal to the melting point or glass transition temperature. The substrate/powder combination is maintained at this temperature for a time sufficient to obtain the desired molecular weight or desired physical properties. The amount of time is readily determined by one of ordinary skill in the art with a minimal amount of experimentation.

There is no particular limitation with regard to particulate fillers that can be used. Useful particulate fillers include, but are not limited to, carbon black, graphite, silica, particulate metal oxides, solid glass spheres, hollow glass spheres, mica, talc, particulate metal filler, metal coated fibers, metal coated particulate fillers, and combinations comprising one of the foregoing particulate fillers. Particulate filler is typically present in the composite in an amount of about 5 to about 75%, preferably about 5 to about 65 wt % and more preferably about 5 to about 55 wt %, based on the total weight of the composition.

When employing a fibrous reinforcement as the substrate, the reactive polyimide powder may be contacted with the fibrous reinforcement by methods appropriate to the chosen fibrous reinforcement. Discrete fibrous reinforcement such as chopped fibers can be handled by methods similar to those described for particulate fillers. Methods of coating continuous fiber reinforcements with a polymeric powder are known in the art and include impregnation and powder coating techniques. Typically in impregnation methods the reactive friable polyimide powder is combined with a solvent to form a slurry. The continuous fiber reinforcement is dipped or passed through the slurry where the reactive friable polyimide powder impregnates the fibrous reinforcement. The impregnated material may be passed through a dryer to remove the solvent. Additionally, the impregnated material may be heated to a sufficiently high temperature in the dryer to permit flow of the reactive friable polyimide powder. If the temperature of the dryer is sufficiently high, the reactive friable polyimide powder may, in addition to flowing, further polymerize. The impregnated material may also be passed through a heated die to consolidate and if desired form the impregnated material into a desired shape. In an alternate embodiment, the reactive friable polyimide powder may be applied to the continuous fibrous reinforcement by powder coating by passing the continuous fibrous reinforcement through a fluidized bed of reactive friable polyimide powder wherein the powder coats and preferably coats and impregnates the fibrous reinforcement. The coated fibrous reinforcement may then be passed through an oven to heat the fibrous reinforcement and allow the reactive friable polyimide powder to melt and flow and optionally to polymerize. The coated fibrous reinforcement may then be passed through a heated or unheated die to consolidate the composite material. Alternatively, the coated fibrous reinforcement may be passed through a heated die without prior exposure to an oven.

When employing an article, such as a sheet, film, or other workpiece as the substrate, the article will be partially or completely coated. The reactive, friable polyimide powder may be contacted with the article by methods known in the art, including, but not limited to, spray coating and electrostatic coating. Suitable articles are stable at temperatures greater than or equal to the softening point of the reactive, friable polyimide powder, and may comprise metal, ceramic, glass, plastic, wood, engineered wood, release material coated articles, and combinations comprising one of the foregoing articles. There is no particular limitation with regard to the thickness or shape of the article. Once the reactive, friable polyimide powder is contacted with the article, the article/powder combination is heated to a temperature sufficient to allow the reactive friable polyimide powder to melt and flow, and preferably to a temperature sufficient to allow polymerization. The reactive, friable polyimide powder is maintained at an elevated temperature for a time sufficient to achieve the desired properties and/or the desired molecular weight of the polyimide powder. There is no particular restriction with regard to the thickness of the polyimide layer resulting from the reactive, friable polyimide powder. When the article is a release material coated article the polyimide layer may remain on the article or the article may be removed, resulting in a polyimide film.

Reactive friable polyimide powder and combinations of reactive polyimide powders can also be used to make polymer blends comprising at least one other compatible polymer. Compatible polymers are defined as those polymers that when combined with the reactive polyimide powder will form a continuous material and will not substantially phase separate, as manifested by peeling, bubbling or delamination. Compatible polymers include, but are not limited to, polycarbonate (PC), polyestercarbonate, polyphenylene sulfide, polysulfones, polyetheretherketone (PEEK), polyesters and combinations comprising one of the foregoing polymers. The relative weight percentages of the polymers in the blend can range from 10 to 90 weight percent based on the total weight of the composition. The amount of each polymer will depend upon the desired properties of the blend and is readily determined by one of ordinary skill in the art. The polymer blends can be made by intimately mixing the components by any method known in the art such as dry blending, co-precipitation or melt blending. A preferred method comprises dry blending the reactive polyimide powder with a compatible polymer to form mixture and melt extruding the mixture.

All patents cited are herein incorporated by reference.

This invention is further illustrated by the following examples, which are not intended to be limiting.

EXAMPLE 1

2,2-Bis(4-(3,4-dicarboxyphenoxy)phenyl)propane dianhydride (682.5 kilograms (kg), 1.31 kilomoles (kmole)), p-phenylene diamine (141.7 kg, 1.31 kmole), and sodium phenyl phosphinate (250 grams) were dissolved in o-dichlorobenzene (2500 liters). The solution was heated to 180° C. under a nitrogen purge for one hour. The manageable slurry (2500 liters) was transferred and cooled to 50° C. in a hold tank and had a solids content of about 22 wt %. Charges (portions of the slurry) (225 liter) were centrifuged for 2.5 hrs. The size of the charge is dependent upon the capacity of the centrifuge. The resulting wet-powder (140 kg) was transferred to a dryer set at 140–160° C. and under a vacuum set at 60 millimeters Hg for 3.5 hours. The resulting coarse powders (125 kg) were collected and divided into portions. The portions were placed in a jet mill and milled for varying amounts of time to obtain average particle sizes from 5 to 200 micrometers depending upon the amount of milling time.

EXAMPLE 2

2,2-Bis(4-(3,4-dicarboxyphenoxy)phenyl)propane dianhydride (341.25 kg, 0.65 kmole), p-phenylene diamine (70.9 kg, 0.65 kmole), and sodium phenyl phosphinate (125 grams) are dissolved in o-dichlorobenzene (2500 liters). The solution is heated to 180° C. under a nitrogen purge for one hour. The manageable slurry (2500 liters) is transferred and cooled to 50° C. in a hold tank and has a solids content of about 11 wt %. Charges (portions of the slurry) (225 liter) were centrifuged for 2.5 hrs. The size of the charge is dependent upon the capacity of the centrifuge. The resulting wet-powder (70 kg) is transferred to a dryer set at 140–160° C. and under a vacuum set at 60 millimeters Hg for 3.5 hours. The resulting coarse powders are collected and transferred to a jet mill and milled to a reduced mean particle size. The reduced solids content decreases the milling time required to obtain a desired particle size.

As can be seen by the preceding examples it is now possible to prepare a reactive friable polyimide powder with a small particle size that can be used to make composite materials and polymer blends.

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A process for the preparation of a reactive, friable polyimide powder comprising dissolving an aromatic dianhydride and an organic diamine in a high-boiling, aprotic organic solvent to form a reaction solution;

heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder.

2. The process of claim 1, wherein the aromatic dianhydride comprises 2,2-bis(4-(3,4-dicarboxyphenoxy)phenyl) propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis(4-(2,3-dicarboxyphenoxy)phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride, or a combination comprising one of the foregoing dianhydrides.

3. The process of claim 1, wherein the organic diamine comprises p-phenylenediamine, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'dimethoxybenzidine, 1,5-diaminonaphthalene, bis(4-aminophenyl)methane, bis (2-chloro-4-amino-3,5-diethylphenyl)methane, bis(4-aminophenyl)propane, 2,4-bis(b-amino-t-butyl)toluene, bis (p-b-amino-t-butylphenyl)ether, bis(p-b-methyl-o-aminophenyl)benzene, bis(p-b-methyl-o-aminopentyl) benzene, 1,3-diamino-4-isopropylbenzene, bis(4-aminophenyl)sulfide, bis(4-aminophenyl)sulfone, bis(4-aminophenyl)ether and 1,3-bis(3-aminopropyl) tetramethyldisiloxane or a mixture comprising one of the foregoing organic diamines.

4. The process of claim 1, wherein the organic diamine comprises p-phenylenediamine and the aromatic dianhydride comprises 2,2-bis(4-(3,4-dicarboxyphenoxy)phenyl) propane dianhydride.

5. The process of claim 1, wherein the high boiling, aprotic organic solvent comprises toluene, xylene, ethylbenzene, propylbenzene, chlorobenzene, dichlorobenzene, trichlorobenzene, biphenyl, terphenyl, diphenylether, biphenyl sulfide, acetophenone, chlorinated biphenyl, chlorinated diphenylethers, and mixtures comprising one of the foregoing organic solvents.

6. The process of claim 1, wherein the high boiling, aprotic organic solvent has a boiling point above 110° C.

7. The process of claim 1, wherein the high boiling, aprotic solvent is o-dichlorobenzene.

8. The process of claim 1, further comprising milling the reactive friable polyimide powder.

9. The process of claim 8, wherein the milling comprises jet milling.

10. The process of claim 8, wherein milling results in a reactive friable polyimide powder with an average particle size of less than or equal to about 100 microns.

11. The process of claim 1, wherein the reaction solution has a solids content after the insoluble polyimide forms of about 10 to about 50 weight percent, based on the total weight of the solution.

12. The process of claim 1, wherein the molar ratio of aromatic dianhydride to organic amine is substantially equimolar.

13. The process of claim 1, wherein the aromatic anhydride is present in excess.

14. The process of claim 1, wherein the organic amine is present in excess.

15. The process of claim 1, wherein aromatic dianhydride contains less than 3 mol % anhydride.

16. The process of claim 1, wherein the reaction solution further comprises a catalyst.

17. A reactive friable polyimide powder produced by the process comprising dissolving an aromatic dianhydride and an organic diamine in a high-boiling, aprotic organic solvent to form a reaction solution;

heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder.

18. The powder of claim 17, wherein the aromatic dianhydride comprises 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis(4-(2,3-dicarboxyphenoxy)phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,2,4,5-benzenetatracarboxylic dianhydride, or a combination comprising foregoing dianhydrides.

19. The powder of claim 17, wherein the organic diamine comprises p-phenylenediamine, ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane or a mixture comprising one of the foregoing organic diamines.

20. The powder of claim 17, wherein the organic diamine comprises p-phenylenediamine, the aromatic dianhydride comprises 2,2-bis(4-(3,4-dicarboxyphenoxy)phenyl)propane dianhydride and the high boiling aprotic organic solvent comprises o-dichlorobenzene.

21. The powder of claim 17, wherein the high boiling, aprotic organic solvent comprises toluene, xylene, ethylbenzene, propylbenzene, chlorobenzene, dichlorobenzene, trichlorobenzene, biphenyl, terphenyl, diphenylether, biphenyl sulfide, acetophenone, chlorinated biphenyl, chlorinated diphenylethers, and mixtures comprising one of the foregoing organic solvents.

22. The powder of claim 17, wherein the high boiling, aprotic solvent has a boiling point above 110° C.

23. The powder of claim 17, wherein the process further comprises milling the reactive friable polyimide powder.

24. The powder of claim 23, wherein the milling comprises jet milling.

25. The powder of claim 23, wherein the reactive friable polyimide powder has an average particle size less than or equal to about 100 micrometers.

26. The powder of claim 17, wherein the reaction solution has a solids content after the insoluble polyimide forms of about 10–50 weight percent, based on the total weight of the reaction solution.

27. The powder of claim 17, wherein the molar ratio of aromatic dianhydride to organic amine is substantially equimolar.

28. The powder of claim 17, wherein the aromatic anhydride is present in excess.

29. The powder of claim 17, wherein the organic amine is present in excess.

30. The powder of claim 17, wherein the aromatic dianhydride contains less than 3 mol % anhydride.

31. A process for coating a substrate comprising contacting the substrate with a reactive friable polyimide powder produced by dissolving an aromatic dianhydride and an organic diamine in a high-boiling, aprotic organic solvent to form a reaction solution;

heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder.

32. The process of claim 31, wherein the organic diamine comprises p-phenylenediamine, the aromatic dianhydride comprises 2,2-bis(4-(3,4-dicarboxyphenoxy)phenyl)propane dianhydride and the high boiling aprotic organic solvent comprises o-dichlorobenzene.

33. The process of claim 31, wherein the substrate comprises a particulate filler, a fibrous reinforcement or an article.

34. The process of claim 33, wherein the particulate filler comprises carbon black, graphite, silica, particulate metal oxides, solid glass spheres, hollow glass spheres, mica, talc, particulate metal filler, metal coated fibers, metal coated particulate fillers, and combinations comprising one of the foregoing particulate fillers.

35. The process of claim 33, wherein the substrate comprises metal, ceramic, glass, plastic, wood, engineered wood, release material coated substrates, and combinations comprising one of the foregoing substrates.

36. The process of claim 33, wherein the fibrous reinforcement comprises discrete fibrous reinforcement.

37. The process of claim 34, wherein the fibrous reinforcement comprises continuous fibrous reinforcement.

38. The process of claim 37, wherein the continuous fibrous reinforcement comprises cloth, mesh, yarns, rovings, thread, non-woven mats, and continuous fibers.

39. The process of claim 31 further comprising heating the reactive friable polyimide powder to a temperature greater than or equal to a temperature sufficient to allow the reactive friable polyimide powder to melt and flow.

40. The process of claim 31, wherein the reactive friable polyimide powder comprises equimolar reactive polyimide powder, anhydride terminated reactive polyimide powder, amine terminated reactive polyimide powder and combinations comprising at least one of the foregoing reactive polyimide powders.

41. A coated substrate produced by the process of claim 31.

42. A coated substrate produced by the process of claim 39.

43. A process to produce a polymer blend comprising combining a polymer with a reactive friable polyimide powder produced by dissolving an aromatic dianhydride and an organic diamine in a high-boiling, aprotic organic solvent to form a reaction solution;

heating the reaction solution under imidization conditions to form an insoluble reactive polyimide and to effect substantially complete distillation of the water of reaction out of the reaction solution; and separating the insoluble reactive polyimide from the reaction solution to form a reactive friable polyimide powder.

44. The process of claim 41, wherein the polymer comprises a compatible polymer.

45. The process of claim 41, wherein the polymer comprises polycarbonate, polyestercarbonate, polyphenylene sulfide, polysulfones, polyetheretherketone, polyesters and combinations comprising one of the foregoing polymers.

46. The polymer blend produced by the process of claim 41.

47. A process for coating a substrate comprising contacting the substrate with a reactive, friable polyimide powder; and heating the powder to melt and fuse the powder to form a coating.

48. The coated substrate produced by the process of claim 47.

49. A process to produce a polymer blend comprising combining a polymer with a reactive, friable polyimide powder.

50. The polymer blend produced by the process of claim 49.

* * * * *